Nov. 5, 1957         R. C. DAVID         2,811,749
METHOD OF MAKING A BARRETTE
Filed July 10, 1953
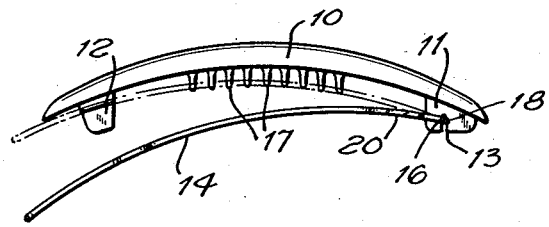
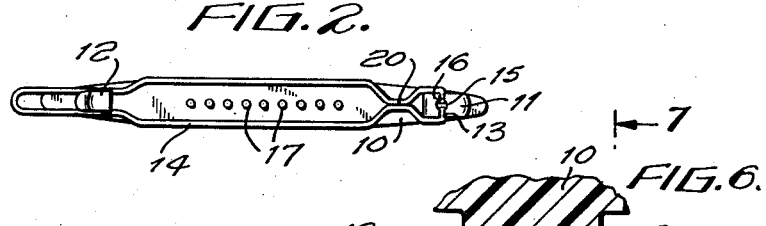
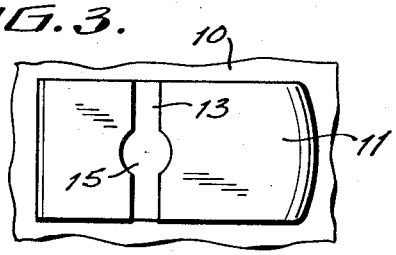
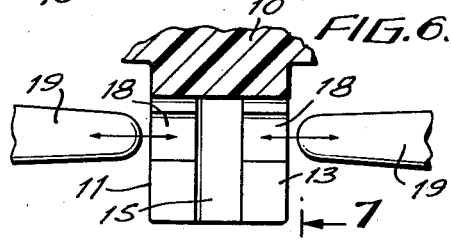
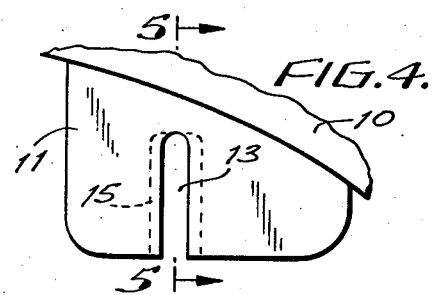
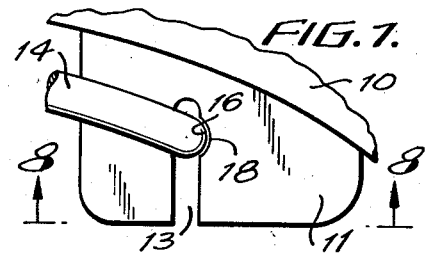
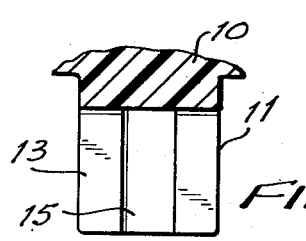
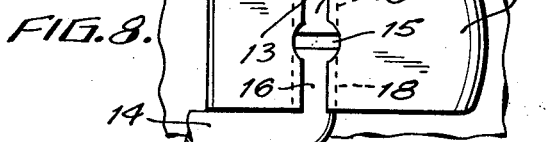
INVENTOR
RAYMOND C. DAVID
BY
ATTORNEY of a corporation of
Massachusetts

United States Patent Office 2,811,749
Patented Nov. 5, 1957

2,811,749

METHOD OF MAKING A BARRETTE

Raymond C. David, Leominster, Mass., assignor to Foster Grant Co., Inc., Leominster, Mass., a corporation of Massachusetts Application July 10, 1953, Serial No. 367,157

4 Claims. (Cl. 18—47.5)

This invention relates to a method of making a barrette, and particularly to a barrette having a body of molded polystyrene plastic and a wire tongue fastened to a hinge block forming a part of the body.

Barrettes of this general type have heretofore usually been made of a cellulose ester plastic, such as cellulose acetate or cellulose nitrate, as disclosed, for example, in Patent Numbers 2,142,849 of January 3, 1939 and 1,813,423 of July 7, 1931.

Polystyrene plastic is much cheaper than the other thermoplastics heretofore used, and has many properties that make its use for molded barrettes highly desirable. Among these are: excellent molding qualities that permit of a faster injection molding cycle; hardness; dimensional stability; less flexible than most other thermoplastics; and, better color appearance.

The hinge block of the body of the barrette must have a hole or holes formed transversely through or in it to provide sockets for the inturned ends of the wire tongue. Where the body is made of molded cellulose ester plastic, such as cellulose acetate, no difficulty is experienced in punching the holes because, as such plastics are relatively soft, the punch will compress the material, resulting in a smooth clean hole. However, when molded polystyrene was used, it was found that because of its hardness and brittleness the holes could not be punched without fracturing or breaking the article. Attempts were made to overcome this by applying heat to soften the plastic, or by use of various other methods known in the industry, but without success.

Fracturing of the material is believed to have been due to the fact that since it could not be compressed, as could cellulose acetate, the hard material removed by punching becomes lodged and wedged in the holes, thus fracturing the brittle material.

The principal object of my invention is to provide a simple, inexpensive, and expeditious method of making barrettes of the hinged tongue type from polystyrene plastic.

In carrying out the method, a slot, the width of which is less than the diameter of the wire tongue, is molded in the hinge block, and the holes or sockets for receiving the tongue are broached into it from opposite sides. The slot provides a space into which the excavated matter may be disposed or through which it may be discharged so that a clean hole free from obstruction results. Polystyrene has only very slight give or flexibility, and it has been found that formation of the slot appears to permit the material to spread somewhat while it is being drilled and thus further avoids any likelihood to fracture during that operation.

It will be understood that in making barrettes of this type by a molding process, it is necessary to punch or drill the holes that form the sockets for the tongue. It would be very costly, slow, and impractical to make and operate molds that could form the sockets during the molding operation itself.

The accompanying drawings illustrate the invention, in which:

Fig. 1 is a side elevation of a barrette made according to the present method, with a wire tongue fastened to the hinge block, the tongue being shown in full lines in open position and in dotted lines in closed position;

Fig. 2 is a bottom plan view of the barrette;

Fig. 3 is an enlarged bottom plan view of the hinge block;

Fig. 4 is a similarly enlarged side view of the hinge block;

Fig. 5 is a vertical section of the hinge block taken on the line 5—5 of Fig. 4;

Fig. 6 is a similar vertical section showing the tongue receiving holes or sockets formed transversely therein, and showing fragmentary end views of the drills for forming the holes;

Fig. 7 is a side elevation of the hinge block with the tongue fastened thereto, only part of the tongue being shown; and, Fig. 8 is a bottom plan view of the hinge block and tongue fastened together as shown in Fig. 7.

The body 10 of the barrette with its integral hinge block 11 and catch 12 are formed of polystyrene plastic by injection molding. The mold cavities are designed to form a transverse slot 13 that extends from side to side of the hinge block 11 and that is narrower in width than the diameter of the wire of which the tongue 14 is made. A circular opening 15 may be formed in the hinge block approximately midway between the sides of the block and passing perpendicularly through the slot 13. While provision of the opening 15 is preferred, for the reasons hereinafter explained, it may be omitted.

The tongue 14 is preformed in the desired shape, substantially as shown, and it has inturned ends 16—16 by which it is fastened to the hinge block. The barrette may or may not have teeth 17.

Opposed holes 18—18 are formed transversely in the hinge block by means of broaches or the like 19—19. The holes 18 are broached into the slot 13 from the opposite sides of the hinge block 11, as best seen in Fig. 6. The broaching operation forms circular openings that are in effect localized enlargements of the slot. Moreover, because of the opening 15 molded centrally in the hinge block, which opening is disposed in the line of passage of the drills, only a portion, approximately two-thirds of the width, of the block must be broached. By this method and construction, as will be clearly seen on referring again to Fig. 6, only a relatively slight amount of the hard polystyrene substance must be cut away and removed in forming the holes 18. The material removed passes into the slot 13 and opening 15 as the broaches progress inwardly and so, by relieving the internal pressure caused by the broachings if they remained unremoved, prevents the hinge block from fracturing.

In fastening the tongue to the hinge block, the inturned ends 16 are inserted in the holes or sockets 18 and thereupon the tongue is soldered or welded, at 20, to prevent its detachment. A machine for automatically preforming these operations may be employed.

What I claim is:

1. A method of making a barrette hinge block for the mounting of a tongue, which comprises molding a hard thermoplastic substance to form a barrette body having an integral hinge block, said hinge block being formed with a transverse slot, and broaching part way into the slot from opposite points of the sides of the block to form enlarged hinge holes in alignment with each other.

2. A method of making a barrette hinge block for the mounting of a tongue, which comprises molding a barrette body having an integral hinge block of polystyrene plastic, said hinge block having an open-ended transverse slot molded therein, and punching part way into the slot from opposite points of the sides of the block to form hinge holes in alignment with each other of greater diameter than the width of the slot.

3. A method of making a barrette hinge block for the mounting of a tongue, which comprises molding a barrette body having an integral hinge block of polystyrene plastic, said block having molded therein an open-ended transverse slot with an opening that extends perpendicularly through the slot at substantially its middle, and punching part way into the transverse slot from opposite points of its ends to form enlarged hinge holes in transverse alignment with each other.

4. A method of making a barrette hinge block for the mounting of a tongue, which comprises molding a polystyrene plastic in the form of a barrette body having an integral hinge block, said hinge block being molded with a transverse slot that extends across the block from side to side, and enlarging the end portions of the slot to form horizontal openings for the mounting therein of the tongue, said openings being somewhat larger in diameter than the width of the slot.

References Cited in the file of this patent
UNITED STATES PATENTS

| | | |
|---|---|---|
| 1,374,524 | Preston | Apr. 12, 1921 |
| 2,045,025 | Richardson | June 23, 1936 |
| 2,177,443 | Schupbach | Oct. 24, 1939 |
| 2,242,074 | Huppert | May 13, 1941 |
| 2,281,130 | Woodruff | Apr. 28, 1942 |
| 2,450,448 | Sawyer | Oct. 5, 1948 |
| 2,599,916 | Holden | June 10, 1952 |